United States Patent Office 3,412,760
Patented Nov. 26, 1968

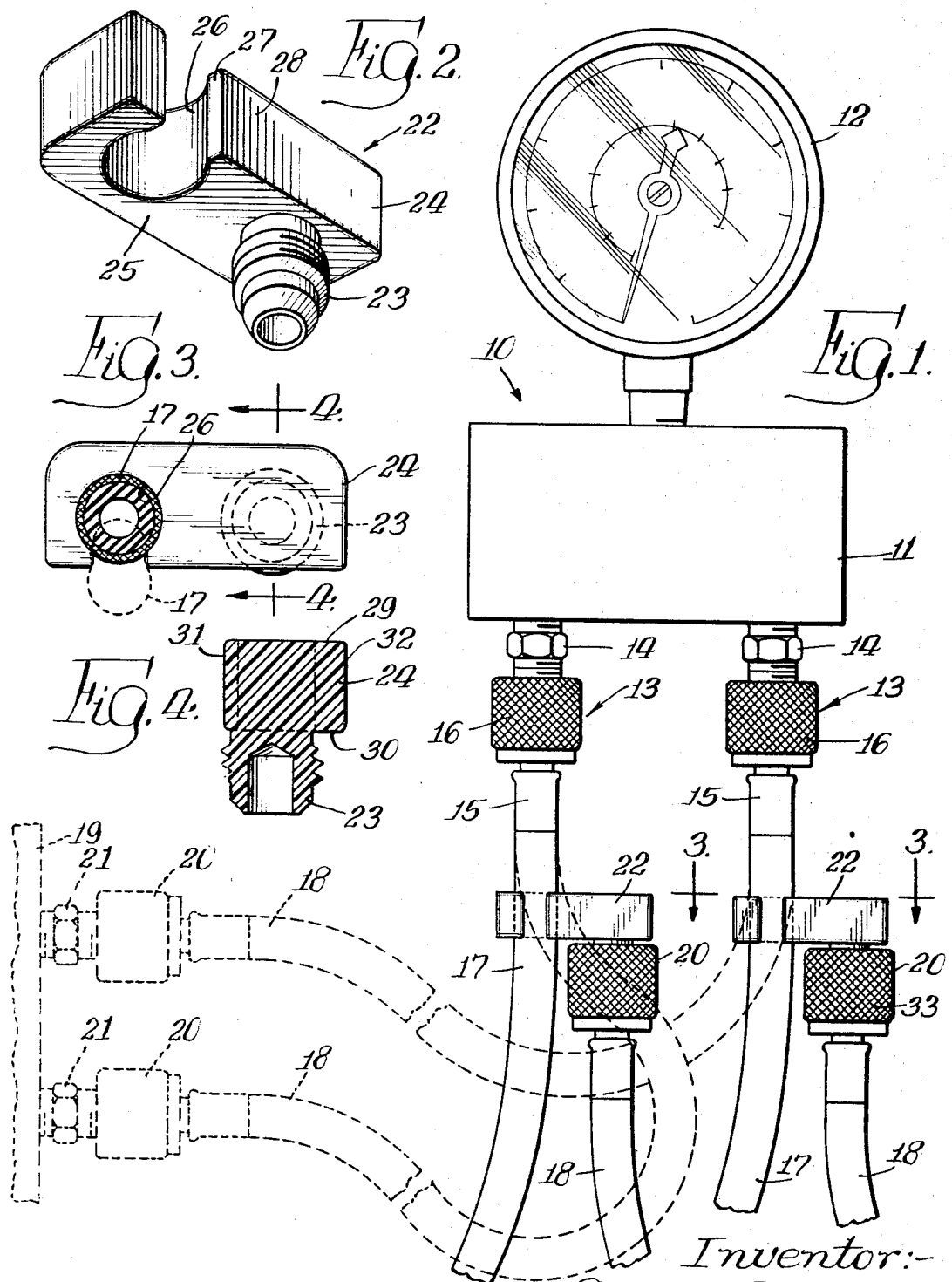

3,412,760
HOSE ASSEMBLY
George E. Franck, Morton Grove, Ill., assignor to Imperial-Eastman Corporation, a corporation of Illinois
Filed Jan. 10, 1966, Ser. No. 519,566
1 Claim. (Cl. 138—96)

ABSTRACT OF THE DISCLOSURE

A hose assembly including a flexible hose having a threaded free end and a rigid block provided with an open-sided slot and a threaded closure integral therewith adapted to have the threaded hose end attached thereto for closing the free end of the hose and maintaining the hose of a looped configuration.

Background of the invention

This invention relates to hose means and in particular to means for closing the free end of a hose assembly.

In devices such as testing gauges, one or more hoses are connected to a manifold for selective connection of the free ends of the hoses to portions of the system being tested. It has been found that the extension of the free ends of the hoses loosely from the manifold presents an undesirable condition in that dirt may enter into the free hose end and the free disposition of the hose end presents an undesirable dangling thereof. One solution to this problem has been to provide on the manifold means for securing the free ends of the hoses thereto. Such a solution has not been found to be completely satisfactory as it presents a serious cost problem in the manufacture of the manifold and requires that the manifold be enlarged sufficiently to permit the mounting of the additional structure thereon. The present invention is concerned with an improved hose assembly wherein new and improved means are provided for eliminating the dangling hose end problem in a novel and simple manner.

Thus, a principal object of the present invention is the provision of a new and improved hose assembly.

A further object of the invention is the provision of such a hose assembly having new and improved means for selectively closing a free hose end.

Another object of the invention is the provision of such a hose assembly having new and improved means for retaining a free hose end in a looped configuration.

Still another object of the invention is the provision of such a hose assembly having new and improved means for selectively retentively closing the free hose end.

A yet further object of the invention is the provision of such a hose assembly including a flexible hose having a free end arranged to be selectively disposed laterally adjacent a portion of the hose spaced from said end, structure for selectively retentively closing said hose end comprising closure means for closing the hose end, means adjustably secured to the spaced hose portion, and means retaining the closure means in association with the adjustably secured means.

Other objects and advantages of the invention will be apparent from the following description taken in connection with the accompanying drawing wherein:

FIGURE 1 is a front elevation of a fluid tester having a hose assembly embodying the invention with the free ends of the hose assembly being shown in broken lines as connected to fluid apparatus as for testing;

FIGURE 2 is an isometric view of the structure for selectively retentively closing the hose end;

FIGURE 3 is an enlarged transverse section taken substantially along the line 3—3 of FIGURE 1; and FIGURE 4 is a vertical section taken substantially along the line 4—4 of FIGURE 3.

In the exemplary embodiment of the invention as disclosed in the drawing, a fluid tester generally designated 10 is shown to comprise a manifold 11 to which is connected a suitable gauge 12. The manifold may be of suitable conventional construction for selectively delivering fluid therethrough to the gauge for indicating fluid pressures delivered to the manifold through a plurality of hose assemblies generally designated 13. As shown in FIGURE 1, the manifold may be provided with suitable fittings 14 to which one end 15 of the hose assemblies 13 may be connected by suitable conventional cooperating fittings 16. The hose assemblies 13 further include an elongated hose portion 17 having a distal free end 18 which as shown in FIGURE 1 may be connected to a fluid pressure device to be tested, such as device 19, by means of suitable fittings 20 secured to the free hose ends 18 and adapted to cooperate with complementary fittings 21 on the device 19.

As discussed briefly above, it is desirable to provide some means for selectively closing the free ends 18 of the hose assemblies 13 when the fluid tester 10 is not in testing use. The present invention comprehends an improved structure generally designated 22 for this purpose. More specifically, as shown in FIGURE 2, structure 22 includes a fitting 23 defining a closure means for closing the free hose end 18 by cooperative engagement with the fitting 20.

In the illustrated embodiment, the fittings 20 and 23 comprise cooperating female and male threaded fittings, respectively, and may be of any suitable conventional construction. The fitting 23 is a blind fitting, so as to define a closure for the hose end 18 when the fitting 20 is threadedly secured thereto. The closure fitting 23 is carried on a block element 24, and in the illustrated embodiment is formed integrally therewith as a plastic molding. The block 24 includes a first portion 25 provided with a cylindrical slot 26 axially parallel to said fitting 23 and having a diameter slightly smaller than the outside diameter of the hose 17, as shown in FIGURE 3. The slot is provided with an open side portion 27 opening through one side 28 of the block 24 to permit the hose to be inserted into the slot 26 laterally by a slight compression thereof, as illustrated in FIGURE 3. The thickness of the block 24 between the upper surface 29 and the lower surface 30 thereof is preferably substantial and herein approximately equal to the diameter of the hose 17 so as to provide a substantial frictional surface for retaining the block on the hose while yet permitting ready adjustable positioning of the block thereon as desired. More specifically, the block may be moved longitudinally on the hose or rotated about the axis of the hose as desired for suitable positioning thereof. The thickness of the block between front surface 31 and rear surface 32 thereof is preferably slightly smaller than the diameter of the fitting 20 to permit facilitated fingertip manipulation of the fitting in connecting it to and removing it from the fitting 23. Further, as illustrated in FIGURE 1, the fitting 20 may be provided with an external knurled surface 33 for further facilitating the fingertip manipulation thereof.

The disposition of the structure 22 on the hose 17 may be adjusted prior to or after the hose end 18 is connected to the fitting 23 as desired. Normally, the structure 22 is disposed on the hose adjacent the end 15 which is thusly spaced substantially from the free end 18 and permitting the hose to be effectively doubled up in the looped secured arrangement whereby the free extent of the hose from the manifold is approximately one-half the free extent of the hose where the free end 18 is allowed to dangle. Thus, the structure 22 not only provides means for closing the hose end 18 by closing the fitting 20 thereon, but also effectively maintains the hose in a compact looped arrangement for facilitated handling of the fluid tester 10 such as during transport thereof.

The structure 22 as indicated above may be formed of suitable material such as molded plastic, and thus is extremely economical to manufacture. As the structure may be mounted on any existing hose structure by simple insertion of the desired portion of the existing hose structure into the slot 26, the structure is adapted for use with existing fluid testers. As the structure is extremely simple and economical of construction, in the event that the threaded fitting portion 23 should become worn or damaged by the repeated attachment of hose end fitting 20 thereto, the structure may be discarded and a substitute structure provided at minimum cost.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a hose assembly including a flexible hose having a threaded free end arranged to be selectively disposed laterally adjacent a portion of the hose spaced from said free end, structure for selectively retentively closing said free end comprising: a rigid block having an open-sided slot having an axial length at least substantially equal to the diameter thereof and adapted to have said spaced hose portion adjustably frictionally retained therein; and a threaded closure integral with said block and extending parallel to the axis of said slot for threadedly receiving and closing said threaded free end of the hose.

References Cited

UNITED STATES PATENTS

| | | | |
|---|---|---|---|
| 1,039,335 | 9/1912 | Tyler | 222—530 X |
| 1,559,470 | 10/1925 | Stewart. | |
| 1,907,763 | 5/1933 | England | 222—530 X |
| 2,292,140 | 8/1942 | Lofgren. | |
| 2,630,247 | 3/1953 | Rafferty | 222—530 X |
| 2,868,416 | 1/1959 | Smith | 222—530 X |
| 3,046,698 | 7/1962 | Breen et al. | 248—68 X |
| 3,122,386 | 2/1964 | Pearson. | |
| 3,147,824 | 9/1964 | Henderson | 184—88 |

HOUSTON S. BELL, JR., *Primary Examiner.*